United States Patent [19]

Yeo

[11] 4,000,391
[45] Dec. 28, 1976

[54] NUCLEAR REACTOR FUEL ELEMENT SPLITTER

[75] Inventor: Denis Yeo, Columbia, S.C.

[73] Assignee: Westinghouse Electric Corporation, Pittsburgh, Pa.

[22] Filed: Aug. 27, 1974

[21] Appl. No.: 500,993

Related U.S. Application Data

[63] Continuation-in-part of Ser. No. 359,925, May 14, 1973, abandoned.

[52] U.S. Cl. .................... 219/121 L; 83/925 R; 83/1; 83/104
[51] Int. Cl.² ........................................ B23K 26/00
[58] Field of Search ............. 219/121 LA, 121 LM, 219/121 EB, 121 EM, 60 R, 60 A; 29/426; 83/925 R, 1, 104; 176/66, 67

[56] References Cited

UNITED STATES PATENTS

| 2,827,405 | 3/1958 | Evans et al. | 29/426 |
|---|---|---|---|
| 3,365,371 | 1/1968 | Lass et al. | 176/66 |
| 3,386,320 | 6/1968 | Pinkham et al. | 83/925 RX |
| 3,672,247 | 6/1972 | Chenel | 83/925 R X |
| 3,689,159 | 9/1972 | Taniguchi | 219/121 LA |
| 3,710,798 | 1/1973 | Bredemeier | 219/121 LA |
| 3,722,338 | 3/1973 | Chenel | 83/925 R X |
| 3,749,878 | 7/1973 | Sullivan et al. | 219/121 LA |

*Primary Examiner*—J. V. Truhe
*Assistant Examiner*—G. R. Peterson
*Attorney, Agent, or Firm*—J. R. Campbell

[57] ABSTRACT

A method and apparatus are disclosed for removing nuclear fuel from a clad fuel element. The fuel element is power driven past laser beams which simultaneously cut the cladding lengthwise into at least two longitudinal pieces. The axially cut lengths of cladding are then separated, causing the nuclear fuel contained therein to drop into a receptacle for later disposition. The cut lengths of cladding comprise nuclear waste which is disposed of in a suitable manner.

6 Claims, 10 Drawing Figures

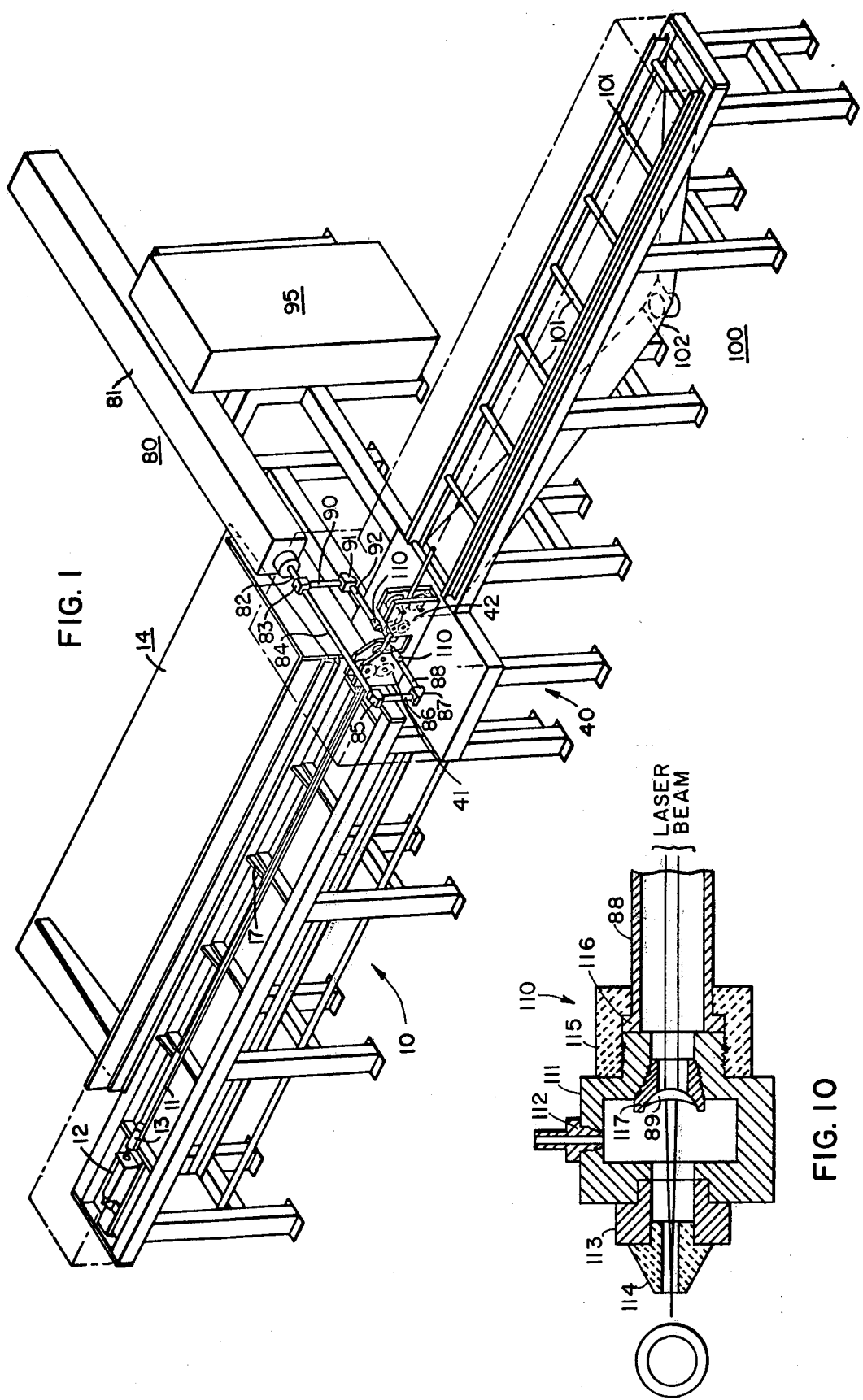

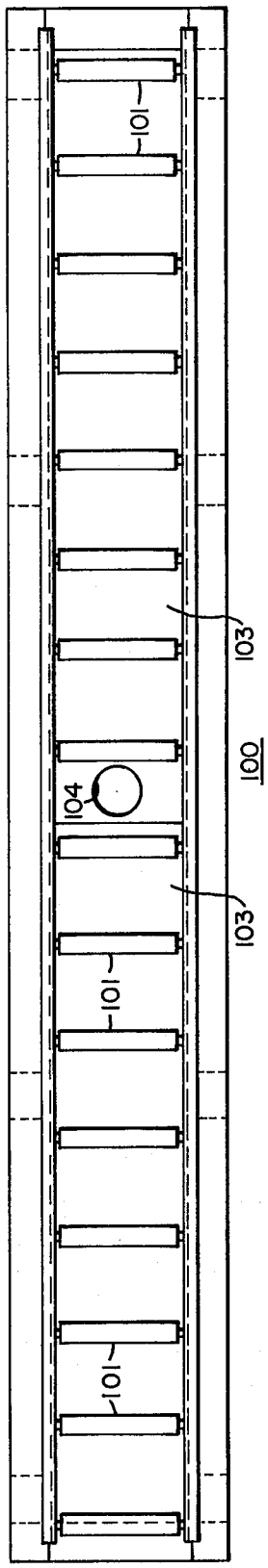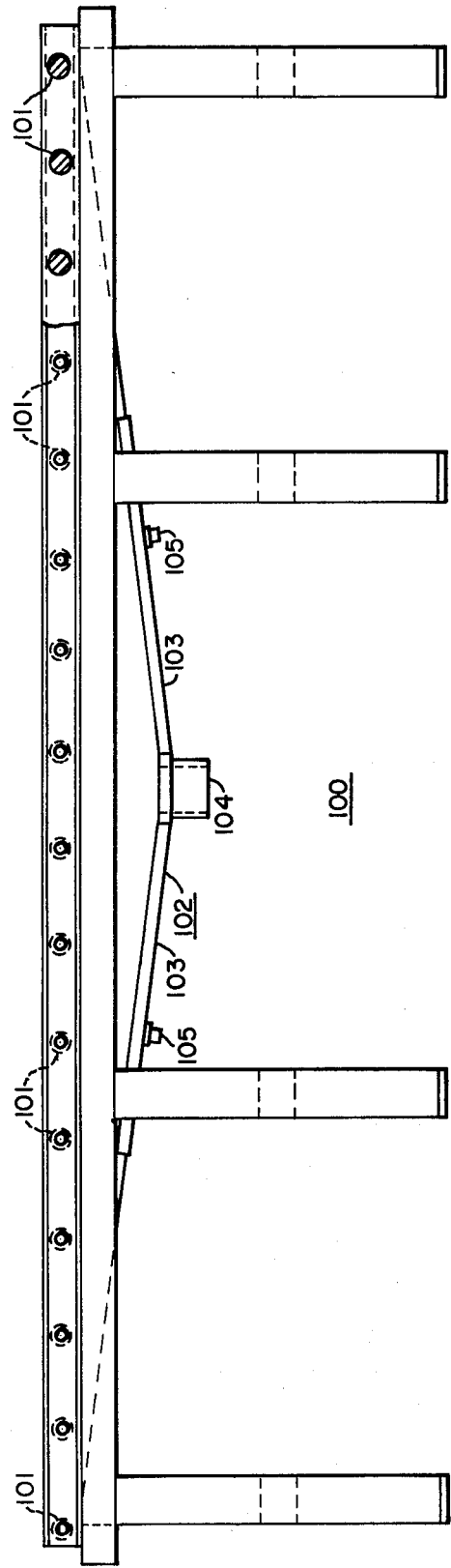

NUCLEAR REACTOR FUEL ELEMENT SPLITTER

CROSS REFERENCE TO RELATED APPLICATIONS

This application is a continuation-in-part of application Ser. No. 359,925 filed May 14, 1973 now abandoned by Denis Yeo entitled Nuclear Reactor Fuel Element Splitter which is assigned to the assignee of the present invention.

BACKGROUND OF THE INVENTION

1. Field of the Invention

This invention pertains to processing of nuclear reactor fuel elements, and more particularly to methods and apparatus for removing nuclear fuel from clad fuel elements.

2. Description of the Prior Art

In today's commercial nuclear reactors, a fissile material, for example enriched uranium, is employed as a nuclear fuel. Fissioning of this material in the reactor produces heat from which electricity is ultimately generated. A typical large nuclear reactor contains approximately 193 fuel assemblies, each fuel assembly containing 208 individual fuel elements. A fuel element, as referred to herein, means a metallic tube, called "cladding", of zircoloy, stainless steel or other material which contains nuclear fuel pellets. Within each of these fuel elements, in the example of the reactor described, there are as many as 240 fuel pellets which comprise the fissile material. Hence, a nuclear reactor contains approximately 9.6 million fuel pellets, at least a portion of which are replaced on a yearly basis approximately.

It is therefore apparent, that the nuclear fuel industry processes a large number of new fuel pellets and a correspondingly large number of new fuel elements to replace those consumed during reactor operation. Moreover, spent fuel, which is the name commonly given to used fuel removed from a reactor, is still valuable in that it may be reprocessed for further use in another reactor at a later date.

In order to reprocess spent fuel, it is first necessary to remove the fuel pellets from the metallic sheath cladding within which they are contained. This is neither a simple nor a fast operation as the spent fuel is highly radioactive and must be handled remotely. Also, the diametral clearance between the pellet outer diameter and the fuel tube or cladding inner diameter is relatively small, nominally of the order of 0.008 inches at assembly. Therefore, there is a high probability that the pellets will bind within the cladding thereby eliminating an obvious removal technique such as pushing the pellets out of the cladding. This binding problem is further aggravated as a result of reactor operation which causes local deformation and shrinkage of the cladding as well as the possibility of diametral growth of the fuel pellets. Together, these effects of reactor operation reduce the already small clearance between the pellets and the cladding and make removal of the fuel more difficult.

Although normal processing of new nuclear fuel elements involves the insertion of fuel pellets into the cladding, there are circumstances where it is necessary to remove fuel pellets from the cladding of new fuel elements. One example is when the fuel element is found during manufacture to be defective in that it doesn't meet the high quality standards required of fuel elements for nuclear reactors. Another circumstance might be where fuel element design has been deemed obsolete prior to reactor use and it is desirous to replace these fuel elements by those of a new design. While removal of fuel pellets from new fuel elements is not as difficult or time consuming as removal of fuel pellets from spent fuel elements, the removal process is still somewhat difficult because of the close clearance involved. Binding of the pellets within the cladding is still a problem; again therefore, the pellets cannot be simply pushed out of the cladding.

In the prior art, the fuel pellets were removed from fuel elements by a method which involved cutting a fuel element crosswise into a number of short sections. The cut sections of fuel element are then placed in a solution which dissolves the metal cladding but does not affect the fuel pellets. Although effective, there are a number of disadvantages to this prior art method. One disadvantage is that the fuel pellets are severely damaged by this removal process and thus, require additional reprocessing prior to reuse. Another disadvantage is that relatively large amounts of fuel dust are generated and this must be specially handled for recycling.

In more recent prior art, the above disadvantages were overcome by a method utilizing mechanical slitting of the cladding into two halves, then separating the two halves and causing the fuel pellets to drop into a receptacle. Unfortunately, a number of new disadvantages arose. It has been shown that the splitting rates are not high and the process involves extensive labor in setting up the equipment, operating it and maintaining the cutting tools.

In the past, therefore, at least two different methods were utilized for removing the fuel pellets from clad fuel elements. However, each of these methods has certain disadvantages which render these methods somewhat unsatisfactory.

SUMMARY OF THE INVENTION

This invention provides a method and apparatus for removing fuel pellets from a clad fuel element. Laser beams are utilized to split the cladding along its length. The cut lengths of fuel cladding are then separated causing removal of the fuel pellets contained therein. The fuel pellets are then stored in a suitable receptacle for later additional processing.

In one embodiment, a single laser beam source is utilized to generate two laser beams which simultaneously cut each side of the fuel element cladding. In order to speed the cutting operation, an oxygen gas assist is directed at the focal points of each laser beam.

It will therefore be apparent to one skilled in the art that the disclosed method is inherently more advantageous than prior art methods in that no mechanical cutting tools are utilized thereby eliminating the problems associated therewith. It will also be apparent that the disclosed method is particularly amenable to processing highly radioactive spent fuel elements which must be handled remotely. In such an application, the laser beam and its associated equipment and controls may be positioned outside of a hot cell containing the fuel elements; hence, cutting of the cladding may be achieved without having to contaminate the cutting apparatus.

BRIEF DESCRIPTION OF THE DRAWINGS

Other advantages of the invention and a better understanding of the invention will be apparent from the following detailed description taken in consideration with the accompanying drawings, in which:

FIG. 1 is an overall isometric view of the apparatus incorporating the principal features of this invention;

FIG. 6 is an elevational view of the exit table assembly portion of the apparatus of FIG. 1;

FIG. 7 is a plan view of the exit table assembly of FIG. 6;

FIG. 10 illustrates the design of a gas nozzle used with the fuel tube cutting laser beams.

DESCRIPTION OF THE PREFERRED EMBODIMENTS

Figure 3:
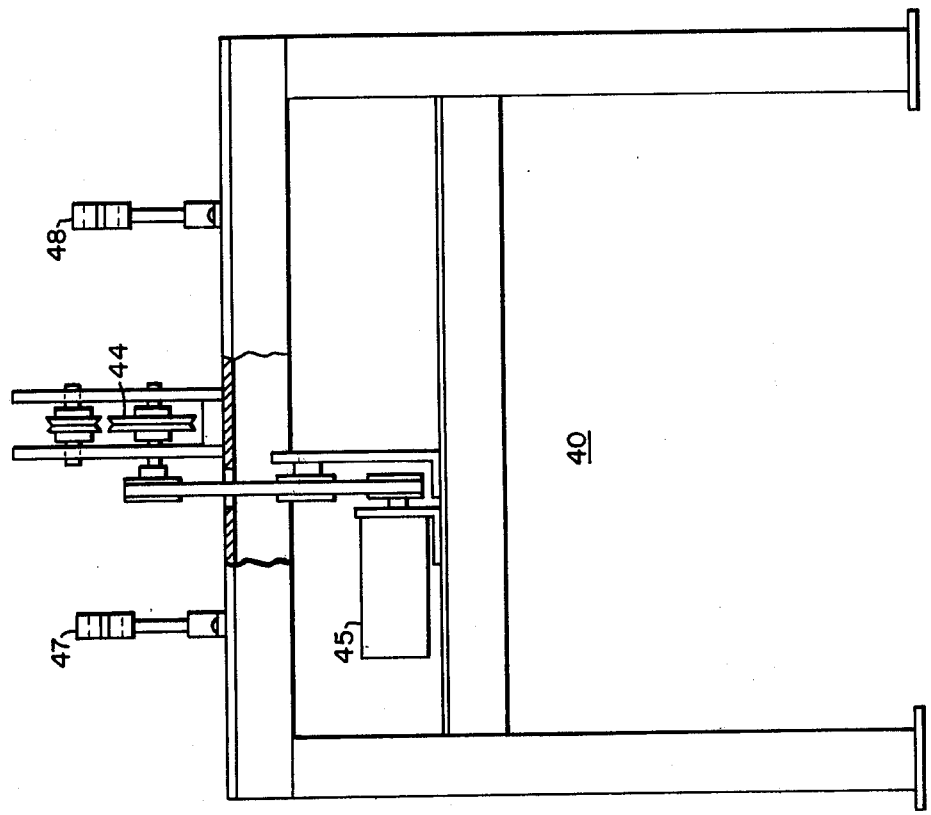
FIG. 3 is a side view of the drive table assembly of FIG. 2.

Throughout the description which follows, like reference characters indicate like elements in the various figures of the drawings.

Referring now more particularly to FIG. 1 of the drawings, apparatus constructed in accordance with the principles of this invention is illustrated therein. The apparatus is designed to feed a single fuel element onto a loading table assembly 10, whereupon it is pushed into drive apparatus mounted on a drive table assembly 40. The fuel element is then simultaneously slit along two sides by laser beams produced by a cutting assembly 80. The cut fuel element is then driven onto an exit table assembly 100 where the fuel element cladding is separated causing the nuclear fuel contained therein to be removed.

It is to be noted that clad fuel elements typically have end plugs welded to each end of the cladding and that these end plugs must be cut off in addition to slitting the cladding before the fuel pellets can be removed. Cutting off the end plugs may be accomplished by laser beam means and is within the contemplation of this invention. For example, the element may be rotated after being pushed into the drive apparatus whereby one end plug is cut off by the laser beams, and may again be rotated after the cladding is slit along its sides whereby the second end plug is cut off.

Figure 4:
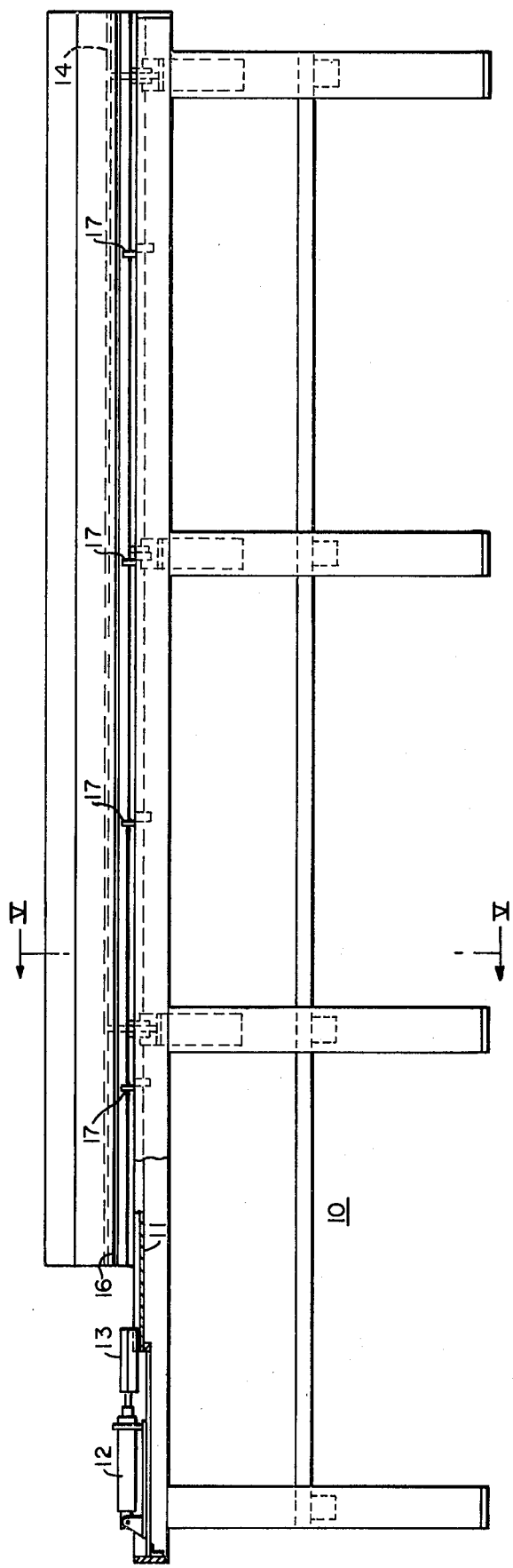
FIG. 4 is an elevational view of the loading table assembly portion of the apparatus of FIG. 1.
Figure 5:
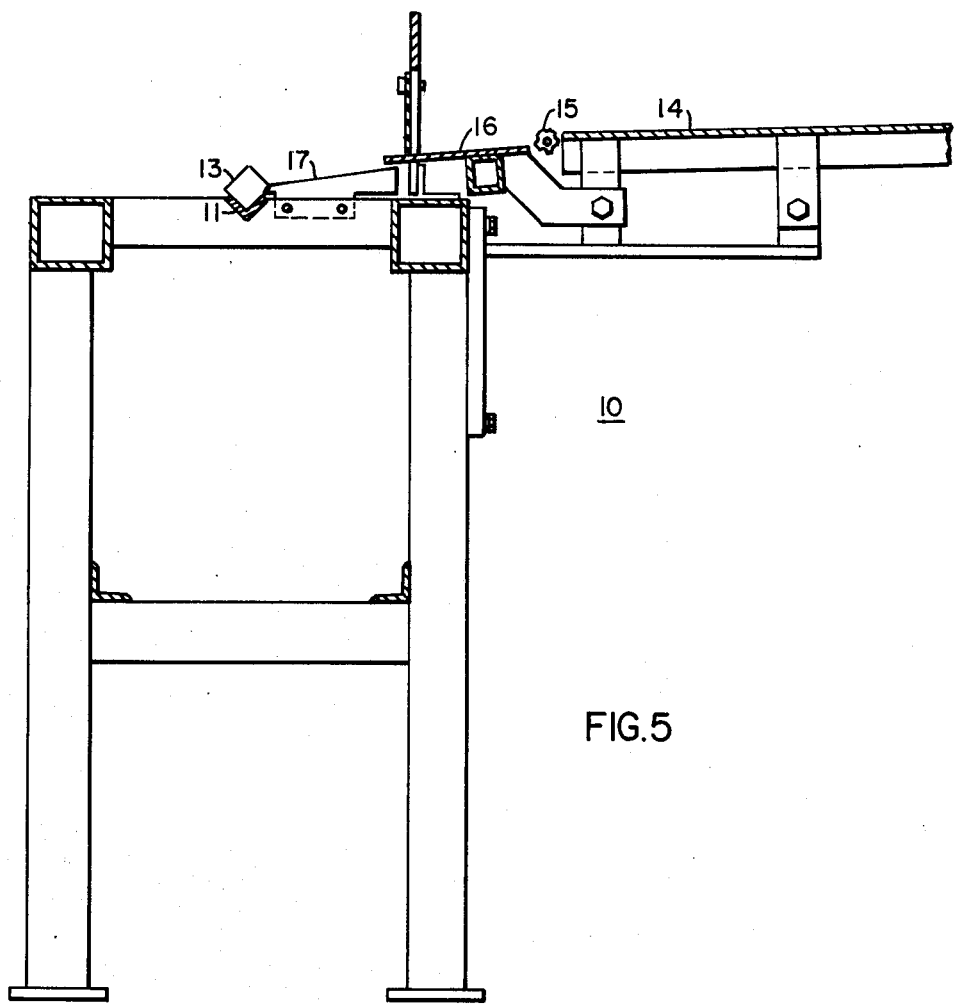
FIG. 5 is a view of the loading table assembly of FIG. 4 taken along the line V—V of that Figure.

FIGS. 4 and 5 illustrate a number of preferred features of the loading table assembly 10. The length of the horizontal surface of the table is such that it will accommodate the full length of a fuel element; thus, in the example shown the table assembly 10 is approximately 13 feet long. The height of the table assembly 10 is not critical as are the heights of the cooperating table assemblies 40, 80 and 100. The height therefore, can be selected consistent with such constraints as manual operation requirements, containment of auxiliary electrical and pneumatic equipment, available space, remote operation requirements and other like considerations.

A V-shaped track 11 is securely mounted to the top of the table assembly 10 along the length thereof. Track 11 serves to position a single fuel element in preparation for slitting of the cladding. Pneumatic means comprising a pneumatic cylinder 12 and a plunger 13 are positioned at one end of track 11. Operation of the pneumatic means pushes a fuel element along track 11 into the drive apparatus on drive table 10.

A loading platform 14 is slopingly mounted to loading table 10 in the manner shown in FIG. 5. Platform 14 permits the temporary storage of a plurality of uncut fuel elements. In the example shown, approximately 100 uncut fuel elements may be loaded onto platform 14 at one time. Suitable automatic feed apparatus, such as that designated by numbers 15, 16 and 17 may be provided so that one fuel element is selected from those stored on platform 14 and directed toward track 11 at a preselected time.

Figure 2:
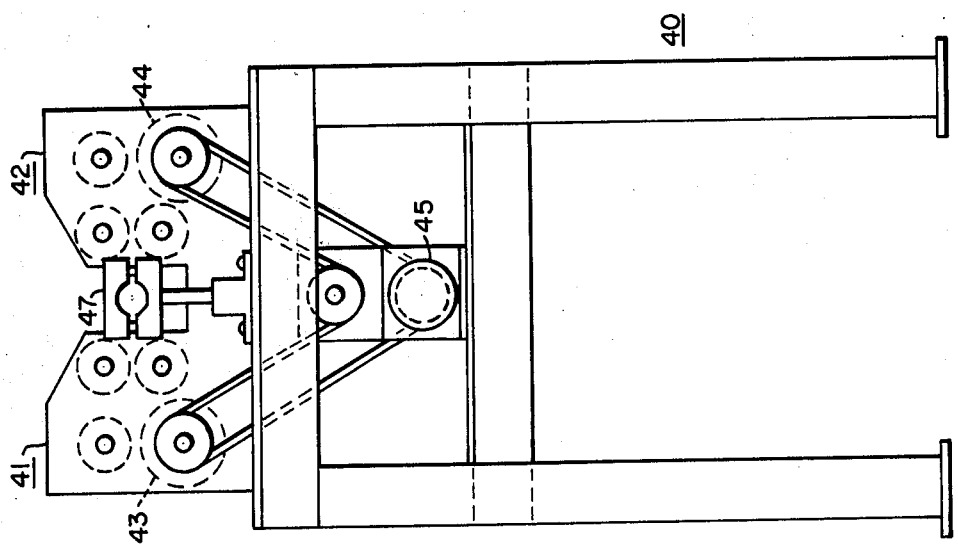
FIG. 2 is a frontal view, partially in section, of the drive table assembly portion of the apparatus of FIG. 1.

The drive apparatus mounted on drive table assembly 40 is shown in detail in FIGS. 2 and 3. In these figures it is seen that a relatively simple driving technique may be utilized. Two sets of axially spaced roller assemblies, 41 and 42 respectively, are mounted on the table. Each of the sets of roller assemblies, in turn, comprise two sets of axially spaced roller assemblies; thus, a total of four roller assemblies are utilized. One roller of each set, 43 of set 41, and 44 of set 42, is driven by a motor 45 which is common to both driven rollers. This arrangement provides for zero variation in the relative driving speeds of both sets of roller assemblies 41 and 42. Use of the four sets of axially spaced roller assemblies permits either set 41 or set 42 to hold, positively a fuel element being driven therethrough without the assistance of the other set. Moreover, this arrangement allows the laser cutting means to be located between roller sets 41 and 42 in order to cut the full length of the fuel element while the element is being fully supported. Thus, the apparatus numbered 47 and 48 serve to position the laser cutting apparatus described below.

The laser cutting assembly 80 is shown in FIG. 1. Any suitable laser source 81 and power supply 95 with sufficient power, for example a 250 watt $CO_2$ gas laser with 50/50 beam divider, may be employed. In the illustrated embodiment, the laser source 81 is table mounted transverse to the axis of the fuel element as it is driven by the drive apparatus. This method of mounting permits the laser beam which is emitted from the source 81 to be split and focused at two sides of the fuel element with a minimum of complexity.

The single laser beam emitted from source 81 travels within a short length of conduit 82 positioned in axial alignment with source 81. A beam splitter 83, such as a reflective wedge, a partially reflective mirror or other like means, is provided at the outlet of conduit 82. As the name implies, the beam splitter 83 divides the single laser beam emitted from source 81 into two laser beams, each having approximately half the power of the original single laser beam. A first of the two laser beams is directed through horizontal conduit 84 whereupon it is re-directed vertically by a fully reflective mirror 85 through vertical conduit 86. It is then directed horizontally, by another fully reflective mirror 87 through conduit 88. A focusing lens means 89 is provided at the outlet of conduit 88. Focusing lens means 89 is suitably designed to focus the energy of the first laser beam at one side of the fuel element cladding such that it cuts through the cladding but does little or no damage to the nuclear fuel contained within the fuel element.

A second of the two laser beams obtained by splitting the beam from source 81 is appropriately directed through conduit 90, turned 90° by a reflective mirror 91, through conduit 92 and then focused by a lens 93 to another side of the cladding. In the example shown, the two points of focus are at opposite sides of the cladding in order to effectuate removal of the nuclear fuel by separating the two halves of the cut cladding.

A gas assist may be utilized to speed the cutting operation. Assuming the cladding is made from a material which is substantially pyrophoric, a gas such as oxygen may be directed at the focal points of each of the laser beams in order to increase the rate of removal of the base material. The details of a method for accomplishing this will be readily apparent to one skilled in the art. FIG. 10 illustrates the design of a commercially available gas nozzle 110 used for this purpose. It comprises a hollow housing 111 having an oxygen inlet 112 and a retainer 113 attached to the front part of housing 111 supports gas directing plug 114 through which oxygen and the laser beams are directed against the fuel element. A second retainer 115 holds a flanged end 116 of laser beam support tube 88, or 92 when a second nozzle is used, immovably on housing 111. Since the nozzle is designed to permit passage of the laser beams through housing 111 and gas end plug 114, laser beam focusing lens 89, or 93 in the second nozzle, is mounted on a hollow cylindrical support 117 removably fixed in housing 111. The laser beam is focused by lens 89 to a point on the tube wall which will assure cutting at the most efficient rate. The oxygen assists in the cutting operation and, as is known, the oxygen atmosphere in housing 111 will not adversely affect the quality of laser beams passing therethrough to the fuel element.

As can be seen in FIG. 7, the exit table assembly 100 essentially comprises a conveyor having a hopper mounted to the underside thereof. A plurality of rollers 101 are mounted transverse to the longitudinal axis of the table, and therefore, transverse to the axis of the fuel element, in such a manner as to allow the rollers 101 to rotate substantially without friction. As a result, the portion of the fuel element, and subsequently the entire fuel element, exiting from the laser cutting beams is power driven or conveyed onto the rollers 101. While on the exiting table 101, the longitudinally cut fuel element cladding may be manually or automatically separated into two halves. At this point the nuclear fuel contained within the cladding drops out or can easily be removed.

A hopper assembly 102 is positioned under the table 101 to catch the removed fuel and to direct it to a central location so that it can be conveniently contained. The bottom panels 103 of the hopper 102 are sloped for this purpose. An opening 104 is provided at the apex of the two sloping bottom panels 103, under which a receptacle (not shown) may be placed. The sloping panels 103 may be equipped with vibrating means 105 to assist moving the fuel toward opening 104.

Figure 9:
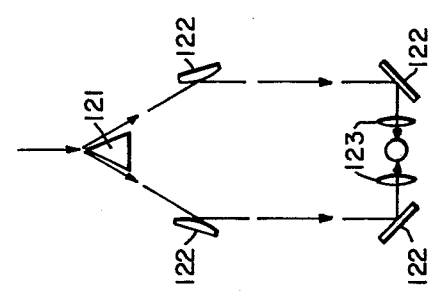
FIG. 9 is a schematic drawing of another method of splitting a single laser source into two as exemplified by this invention.
Figure 8:
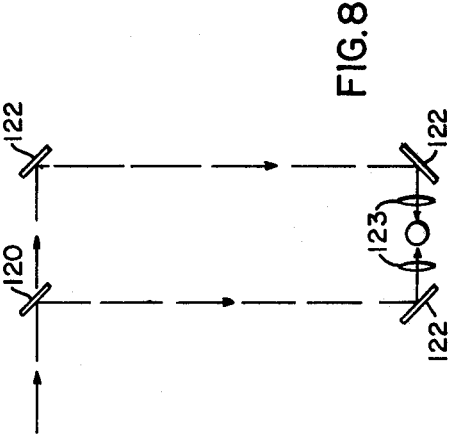
FIG. 8 is a schematic drawing of one method of splitting a single laser source into two as exemplified by this invention.

FIGS. 8 and 9 schematically illustrate two of a number of possible arrangements for splitting a single laser beam into two and focusing the resulting beams at two opposite sides of a tube to be cut. In FIG. 8, the single laser beam is split by a semi-reflective mirror 120; in FIG. 9, the single laser beam is split by a reflective wedge or prism 121. In either method, subsequent changes in laser beam direction is accomplished by fully reflective mirrors 122 and focusing is performed by lenses 123.

It should be noted that the entire apparatus as provided by this invention is fully covered in order to prevent possible contamination of the atmosphere with radioactive particles. The covers may also be operationally connected to suitable vacuuming or exhaust apparatus which includes absolute filters to trap any radioactive dust which may be generated from the fuel element cutting operation or the fuel removal process.

From the foregoing description, taken in connection with the drawings, it is seen that this invention provides a method and apparatus which allows effortless and rapid removal of fuel pellets from a clad fuel element by utilizing a laser beam to simultaneously cut both sides of the cladding.

Since numerous changes may be made in the abovedescribed apparatus and different embodiments of the invention may be made without departing from the spirit and scope thereof, it is intended that all the matter contained in the foregoing description or shown in the accompanying drawings shall be interpreted as illustrative and not in a limiting sense.

I claim:

1. Apparatus for splitting clad fuel elements comprising a base, drive means supported by said base for driving a clad fuel element longitudinally therethrough and in a direction along the base length; and laser means mounted adjacent said base, said laser means comprising a laser beam source and beam splitting and reflecting means associated therewith which splits the laser beam from the source into two beams which respectively are reflected to a pair of laser beam focusing devices positioned on opposite sides of said fuel element, said focusing devices being effective in directing said split beams toward said fuel element for simultaneously cutting at least two sides of said fuel element cladding, along the length thereof, as said fuel element is driven past said laser means by said drive means.

2. The apparatus of claim 1, wherein said drive means comprises at least one set of power driven rollers having peripheral surfaces complementary to said fuel element surface and spaced a distance sufficient to grasp said fuel element and pull it therethrough and past said laser beams.

3. The apparatus of claim 1, including means for directing jets of a gas at the laser cutting locations to produce an exothermic action at each side of said fuel element for increasing the speed of cutting said fuel element cladding;

said gas directing means comprising a gas source and piping connected at one end of said source, said piping having its other end open and terminating at the laser cutting locations.

4. The apparatus of claim 1, including a loading table and an exiting table, said tables having said drive means and said laser beam focusing devices; and wherein said loading table includes a base, a V-shaped track connected to said base, said track serving to align a fuel element positioned therein with said drive means in preparation for laser cutting, and pneumatic plunger means connected to said base and aligned with said track for pushing said fuel element into said drive means.

5. The apparatus of claim 4, wherein said exiting table includes a base, a plurality of cylindrical rollers with each roller being positioned transverse to the longitudinal axis of said table, said rollers acting as a conveyor for the cut fuel elements, and a hopper connected to said table under said rollers, said hopper having sloping sides directed toward a central hole contained therein, said hopper serving to channelize, toward said hole, nuclear fuel which is removed from said cut fuel element when the longitudinally cut pieces of cladding are separated.

6. The apparatus of claim 4, including a feed platform slopingly mounted to said loading table for automatically feeding a single fuel element onto said loading table, said feed platform comprising an open planar surface for storage thereon of a plurality of fuel elements, and means for controlling the release of a single fuel element thereby allowing said released fuel element to roll from said feed platform into said V-shaped track on said loading table.

* * * * *